US009876683B2

(12) United States Patent
Kirrmann

(10) Patent No.: US 9,876,683 B2
(45) Date of Patent: Jan. 23, 2018

(54) DETERMINING THE NETWORK TOPOLOGY OF A COMMUNICATION NETWORK

(71) Applicant: ABB RESEARCH LTD, Zürich (CH)

(72) Inventor: Hubert Kirrmann, Dättwil (CH)

(73) Assignee: ABB Research Ltd., Zurich (CH)

( * ) Notice: Subject to any disclaimer, the term of this patent is extended or adjusted under 35 U.S.C. 154(b) by 167 days.

(21) Appl. No.: 14/577,115

(22) Filed: Dec. 19, 2014

(65) Prior Publication Data
US 2015/0156072 A1 Jun. 4, 2015
US 2015/0333966 A2 Nov. 19, 2015

Related U.S. Application Data

(63) Continuation of application No. PCT/EP2013/063003, filed on Jun. 21, 2013.

(30) Foreign Application Priority Data
Jun. 21, 2012 (EP) .................................. 12172854

(51) Int. Cl.
H04L 12/24 (2006.01)
H04L 12/26 (2006.01)
H04L 7/00 (2006.01)

(52) U.S. Cl.
CPC .............. *H04L 41/12* (2013.01); *H04L 7/00* (2013.01); *H04L 41/0206* (2013.01); *H04L 41/046* (2013.01); *H04L 43/0852* (2013.01); *Y04S 40/164* (2013.01); *Y04S 40/168* (2013.01)

(58) Field of Classification Search
None
See application file for complete search history.

(56) References Cited

U.S. PATENT DOCUMENTS

| 2001/0050903 A1* | 12/2001 | Vanlint ............... H04L 1/24 370/252 |
| 2004/0252694 A1* | 12/2004 | Adhikari ............. H04L 41/12 370/395.2 |
| 2006/0285501 A1 | 12/2006 | Damm |
| 2007/0041317 A1 | 2/2007 | Haley et al. |
| 2009/0116404 A1 | 5/2009 | Mahop et al. |

(Continued)

FOREIGN PATENT DOCUMENTS

EP 1 734 690 A1 12/2006

OTHER PUBLICATIONS

Written Opinion (PCT/ISA/237) dated Nov. 25, 2013, by the European Patent Office as the International Searching Authority for International Application No. PCT/EP2013/063003.

(Continued)

Primary Examiner — Gary Mui
(74) Attorney, Agent, or Firm — Taft Stettinius & Hollister LLP

(57) ABSTRACT

A network management agent, device or module determine the network topology of a communication network based on at least one neighbor network or end device identity and corresponding network link communication delay collected from, determined by, and stored in a Management Information Base of, at least one first network device of the communication network. Neighbor identities and communication delays are determined according to the IEEE 1588 standard.

4 Claims, 2 Drawing Sheets

(56) References Cited

U.S. PATENT DOCUMENTS

2010/0329125 A1* 12/2010 Roberts ................ H04J 3/0667
370/241.1
2011/0286560 A1* 11/2011 Pignatelli .............. H04J 3/0655
375/356

OTHER PUBLICATIONS

International Search Report (PCT/ISA/210) dated Nov. 25, 2013, by the European Patent Office as the International Searching Authority for International Application No. PCT/EP2013/063003.
Written Opinion (PCT/ISA/237) dated Aug. 16, 2012, by the European Patent Office as the International Searching Authority for International Application No. PCT/EP2013/063003.

* cited by examiner

DETERMINING THE NETWORK TOPOLOGY OF A COMMUNICATION NETWORK

RELATED APPLICATIONS

This application claims priority as a continuation application under 35 U.S.C. §120 to PCT/EP2013/063003, which was filed as an International Application on Jun. 21, 2013 designating the U.S., and which claims priority to European Application 12172854.7 filed in Europe on Jun. 21, 2012. The entire contents of these applications are hereby incorporated by reference in their entireties.

FIELD

The present disclosure relates to determining the topology of a communication network of an industrial process control system, such as a substation automation system.

BACKGROUND INFORMATION

In order to discover and determine the topology of a communication network, it may be required that network devices report knowledge of their local topology to a network management device. Several products exist on the market, such as, for example, Hirschmann's HiVision, wherein protocols like ARP (ARP: Address Resolution Protocol), ICMP (ICMP: Internet Control Message Protocol), or SNMP (SNMP: Simple Network Management Protocol) are used. These tools operate on layer 3, for example, using IP addresses (IP: Internet Protocol) of the network devices, and are not directly aware of layer 2 devices or configurations, such as, for example, media converters, repeaters, unmanaged bridges or switches operating on layer 2 only.

On the link layer, namely on layer 2, the topology of communication networks may be discovered using the vendor-neutral Link Layer Discovery Protocol (LLDP, IEEE 802.1AB) or using vendor-specific protocols such as Microsoft's Link Layer Topology Discovery (LLTD), the Cisco Discovery Protocol, or any other vendor-specific protocol. In the LLDP, network devices send through each of their network interfaces, at a fixed interval, a so-called Link Layer Discovery Protocol Data Unit (LLDPDU) in the form of an Ethernet frame, which has its destination MAC address (MAC: Media Access Control) set to a specific multicast address. Information gathered with LLDP is stored in the network devices in a management information database (MIB) and may include system names, port names, VLAN names, etc. The MIB of the network devices may be queried with the SNMP in order to discover the network nodes and establish the topology of a network in which all devices are LLDP-enabled. The latter prerequisite, however, is not fulfilled in most automation networks deployed today.

SUMMARY

An exemplary embodiment of the present disclosure provides a method for determining the network topology of a communication network including at least one first network device connected through at least one network link to at least one neighboring network device. The at least one first network device and the at least one neighboring network device are synchronized according to the IEEE 1588 standard. The exemplary method includes determining, by each of the at least one first network device, an identity of the at least one neighboring network device and a communication delay of the at least one network link, respectively. The exemplary method also includes collecting, by a network manager, the respective determined identity and communication delay, and determining a network topology of the communication network including a length of the at least one network link therefrom.

An exemplary embodiment of the present disclosure provides a network management agent for determining the network topology of a communication network including at least one first network device. Each first network device is connected through at least one network link to at least one neighboring network device. The at least one first network device and the at least one neighboring network device are synchronized according to the IEEE 1588 standard. The network management agent includes a processor configured to, by executing a computer program tangibly recorded on a non-transitory computer-readable recording medium of the network management agent, collect, from each of the at least one first network device, an identity of the at least one neighboring network device and a communication delay of the at least one network link, respectively, and determine the network topology of the communication network including a length of the at least one network link therefrom.

An exemplary embodiment of the present disclosure provides a non-transitory computer-readable recording medium having a computer program tangibly recorded thereon that, when executed by a processor of a computer processing device, causes the processor to carry out a method for determining the network topology of a communication network including at least one first network device connected through at least one network link to at least one neighboring network device. The at least one first network device and the at least one neighboring network device are synchronized according to the IEEE 1588 standard. The exemplary method includes determining, by each of the at least one first network device, an identity of the at least one neighboring network device and a communication delay of the at least one network link, respectively. The exemplary method also includes collecting, by a network manager, the respective determined identity and communication delay, and determining a network topology of the communication network including a length of the at least one network link therefrom.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
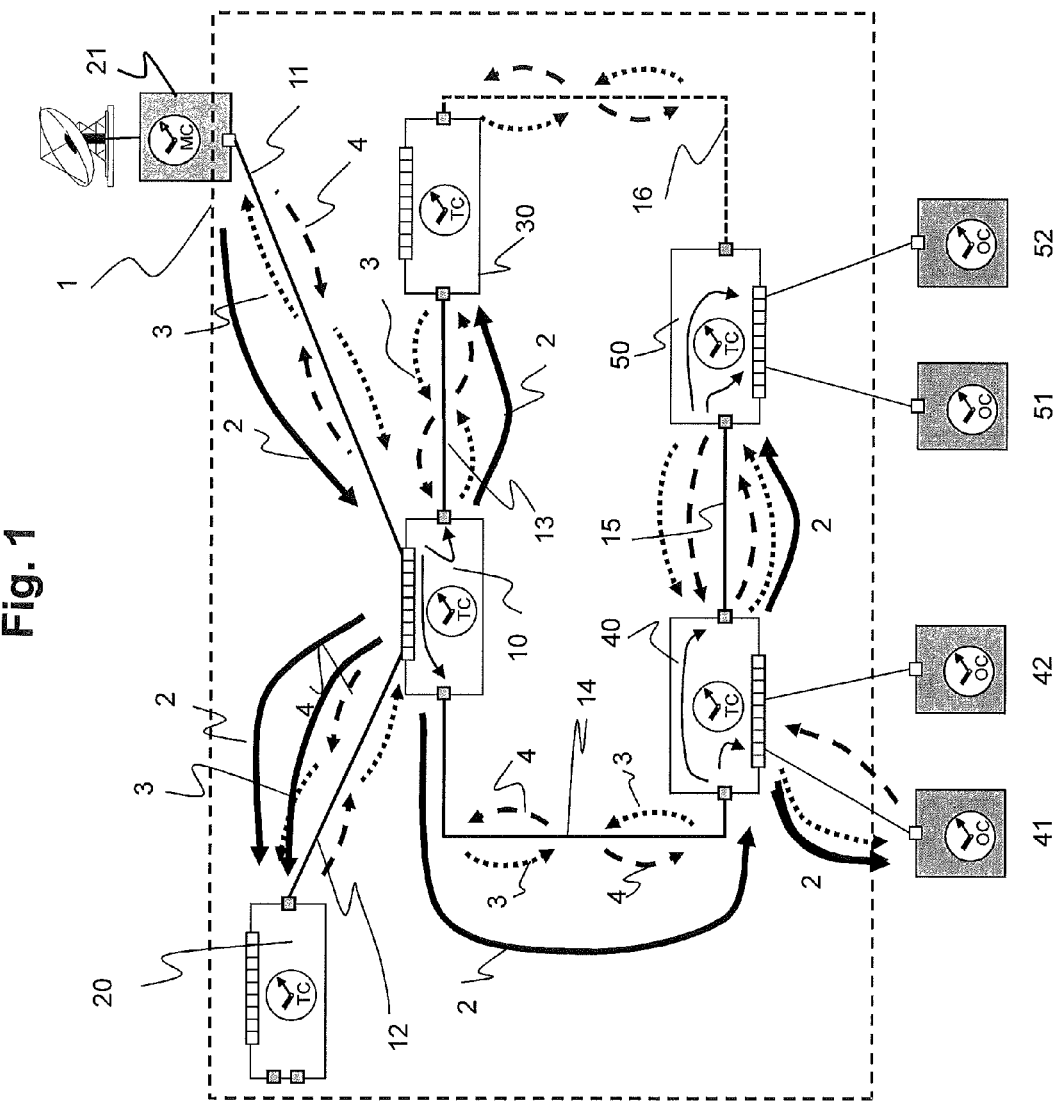
FIG. 1 shows a sample network topology of a communication network according to an exemplary embodiment of the present disclosure.

Exemplary embodiments of the present disclosure provide a method and a network management agent for determining the topology of a communication network which is widely deployable and which includes additional aspects relating to the network topology. According to an exemplary embodiment, the communication network includes one or more first network devices, which are each connected through one or more network links to one or more neighboring network devices. The one or more first network devices and the one or more neighboring network devices are synchronized according to the IEEE 1588 standard entitled "Precision Time Protocol." Exemplary embodiments of the present disclosure avoid at least some of the disadvantages of the prior art in communication network topology determination.

According to an exemplary embodiment of the present disclosure, the network topology of a communication network is determined, where the communication network includes one or more first network devices each connected through one or more network links to one or more neighboring network devices or peer devices includes the following steps. Each of the one or more first network devices determines an identity of each of the respective neighboring network devices as well as a communication delay, or peer delay, between the first network device and each of the respective neighboring network devices according to the above-described IEEE 1588 standard. The determined identities of the respective neighboring network devices and the communication delays of the respective communication links are collected by a network manager, and exploited to determine the network topology of the communication network including a length of the one or more network links.

According to an exemplary embodiment the present disclosure, from the communication delays, additional conclusions can be drawn regarding some physical, as opposed to purely logical, aspects of the network topology. For example, the inter-device communication delays of a deployed network may be converted into distances or cable lengths and compared to the corresponding intended or design parameters. Furthermore, excessive communication delays may be interpreted as being due to unwanted devices in the communication network that do not adhere to the path delay determination protocol.

Exemplary embodiments of the present disclosure take advantage of the fact that in communication networks synchronized according to the IEEE 1588 standard, the network devices synchronize to a reference clock upon receipt of a synchronization message. In such networks, as the port through which a synchronization message arrives can vary upon reconfiguration of the network or change of the master clock, each device regularly calculates the peer delays on all of its ports. By identifying the neighboring devices and determining the communication delays to neighboring network devices, a communication device determines its local network topology. A network manager ultimately collects these local network topologies and determines the network topology of the communication network by reverting to known protocols such as SNMP. Moreover, an additional parameter describing the network topology is provided because the communication delay between the network devices is determined. This allows for a check to be made if the network corresponds to the engineering drawings and can determine if the physical distance has been respected and if unauthorized devices have been inserted.

In accordance with an exemplary embodiment, the one or more first network devices transmit a peer delay request message to the one or more neighboring network devices. The peer delay request message is received by the one or more neighboring network devices and triggers the neighboring network devices to transmit a peer delay response message to the one or more first network devices. The peer delay response message is received by the one or more first network devices and enables the latter to determine the one or more communication delays between the one or more first network devices and the one or more neighboring network devices as provided for in IEEE 1588. In other words, the network devices send spontaneously to all devices to which they are connected a peer delay request message to which the peer responds with a peer delay response message containing its identity and a time stamp indicating the time difference between the instant the device received the peer delay request and responded with the peer delay response message and possibly the absolute time as seen on the local clock of the peer, as well. Thus, the sender of the peer delay request can determine the identity of and the line propagation delay to all its peers and thus generate network topology information. The IEEE 1588 standard is becoming a widely available standard in network devices, and the only addition required is the ability to report the identity of the peer and the value of the peer delay to network management.

In accordance with an exemplary embodiment, a broadcast device is configured to broadcast a synchronization message to the one or more first network devices enabling the one or more first network devices to receive the synchronization message via a first port or network interface, and triggering the one or more first network devices to transmit the synchronization message via one or more second ports or network interfaces to neighboring nodes. Accordingly, the synchronization message is broadcasted to network devices not directly connected to the broadcast device. The synchronization message may then be exploited in determining the communication delays, for example, in connection with response messages transmitted by the neighboring nodes to the one or more first network devices.

In accordance with an exemplary embodiment, a graphical network diagram is generated showing the actual network topology of the communication network. The actual network topology of the communication network can thus be easily verified.

In accordance with an exemplary embodiment, a graphical network diagram showing the design of the network topology of the communication network is updated. For example, updating the graphical network diagram may include marking missing or erroneous network links. Accordingly, the actual network topology of the communication network including idle links can thus be easily compared to a designed network topology according to design requirements.

In accordance with an exemplary embodiment, a network management agent is configured to collect through, for example, SNMP (SNMP: Simple Network Management Protocol) from a MIB (MIB: Management Information Base) stored in the one or more first network device, the one or more communication delay together with the MAC address (MAC: Media Access Control) of the one or more first network device. By collecting the MAC address, the interfaces of the network devices are uniquely identified. Moreover, the communication delay of the network links provide additional information about the network topology of the communication network. As data is stored in widely deployed MIB and collected to the widely available SNMP, collection of the data is widely deployable in various communication networks.

Exemplary embodiments of the present disclosure relate to a network management agent, device, or module for determining the network topology of a communication network based on at least one neighbor network or end device identity and corresponding network link communication delay collected from, determined by, and stored in a Management Information Base of, at least one first network device of the communication network. Neighbor identities and communication delays are preferably determined by reverting to the IEEE 1588 standard entitled "Precision Time Protocol."

Exemplary embodiments of the present disclosure are described hereinafter in terms of the functions performed by the network management agent, device or module, which may be collectively referred to as devices of the present disclosure. It is to be understood that the functions of these devices as described hereinafter are each respectively implemented in one or more computer processing devices configured to individually and/or collectively perform the functions of the network management agents, devices or modules. Such computer processing devices may be a personal computer or server computer each appropriately programmed to carry out the respective functions of the devices as described herein. The computer processing devices each include a processor and a non-transitory computer-readable recording medium, which is a non-volatile memory such as a ROM, hard disk drive, flash memory, optical memory, etc. The non-transitory computer-readable recording medium has tangibly recorded thereon a computer program and/or computer-readable instructions which, when executed by the processor of the computer processing device, causes the processor to perform the operative functions of the devices as described herein. The processor may be a general-purpose processor such as those produced by Intel® or AMD®, for example. Alternatively, the processor may be an application specific processor which is specifically designed for the computer(s) of the respective device(s).

FIG. 1 shows a sample network topology of a communication network 1 including several network devices 10, 20, 30, 40, 50 and network end devices 21, 41, 42, 51, 52. In particular, the communication network 1 may be an Ethernet based communication network, wherein data packets are transported by network devices 10, 20, 30, 40, 50, such as, for example, bridges, routers, servers, computers, etc., which are connected through network links 11, 12, 13, 14, 15, 16. The network links may include in particular Ethernet network cables or fiber optical cables. The communication network 1 may be designed to be used in an industrial automation system.

The network devices 10, 20, 30, 40, 50 are designed to receive and forward network traffic, and they may themselves consume parts of the received traffic. For example, a bridge according to the IEEE 802.1D standard is designed to receive and transmit network traffic on a layer 2, i.e. link layer, of the communication network 1. As bridges operate on layer 2 only, they are not discoverable on layer3, such that, for example, an application running on a server at layer 3 is not able to discover the layer 2 topology of the communication network 1. However, layer 2 topology is required in order to verify that the communication network 1 has been properly installed and configured, for example, or that the communication network 1 is operating without errors or failures.

As shown in FIG. 1, the communication network 1 includes a broadcast device 21, which may include a grandmaster with a grandmaster clock MC according to the IEEE 1588 standard or a similar protocol, such as, for example, IEEE 802.1AS. As indicated in FIG. 1, the broadcast device 21 may be connected to a GPS receiver (GPS: Global Positioning System), such that the grandmaster clock MC may be synchronized with an accurate time from one or more GPS satellites, for example. However, the grandmaster clock MC may receive a precise time through any other suitable device, in particular with a high-stability oscillator.

The broadcast device 21 broadcasts a synchronization message 2, which is received by network devices 10, 20, 30, 40, 50 of the communication network 1 and all end devices 41, 42, 51, 52. The network devices 10, 20, 30, 40, 50 and the end devices are configured according to the IEEE 1588 standard, for example. Accordingly, the network devices 10, 20, 30, 40, 50 may include a transparent clock TC and may be configured to forward the synchronization message 2 received on one of its network interfaces to all its other network interfaces. According to the IEEE 1588 standard, for example, a correction is computed which is sent in the same synchronization message 2' or in a subsequent synchronization message 2" (one-step or two-step synchronization). Hence, the synchronization message 2 is broadcasted from the grandmaster device 21 including the master clock MC to the network devices 10, 20, 30, 40, 50, which comprise transparent clocks TC, of the communication network 1.

To compute the time correction due to the link delay, all network devices of the communication network 1 may be configured to transmit one or more peer delay request messages 3 through all their network interfaces, which are received by one or more peer neighboring devices, for instance device 10 sends such peer delay request to network devices 20, 30, 40 and to the end device 21. The device receiving the peer delay request message 3 can be configured to answer immediately with a peer delay response message 4 back to the originator of the peer delay request, in this case the network device 10.

The network devices 10 computes the communication delays d12, d13, d14 to its neighbors by time-stamping the peer delay request message 3 and receiving the peer delay response message 4 which also contains the sending time. For example, the peer delay request message 3 may include a first timestamp indicating the time when the peer delay request message 3 was sent. The peer delay response message 4 may further include a second timestamp indicating the time difference between the reception of message 3 and the sending of message 4, which is called the latency. The originator records the time at which the peer response message 4 was returned. Hence, the communication delays d12, d13, d14 may be computed by subtraction of the first timestamp from the second timestamp and subtracting the received latency. The computation of communication delays may also be performed by the end devices 41, 42, 51, 52, which comprise ordinary clocks OC, and by the broadcast device 21, which includes the master clock MC.

The communication delays d12, d13, d14 between the network devices 10, 20, 30, 40, 50 are a function of the cable length. Accordingly, on the basis of the computed communication delays d12, d13, d14, the cable length between network devices 10, 20, 30, 40, 50 may be computed. Moreover, network devices which do not conform to, for example, the IEEE 1588 standard may be detected, as such network devices introduce a significant additional communication delay, which is well in excess of any expected cable propagation delays. The wave propagation speed s on a network cable may range from 0.59 c to 0.77 c (c: speed of light). Accordingly, the delay on a network cable segment of the length of 1 may range from 4.3 ns to 5.6 ns. On the other hand, the switching delay of network devices such as network switches or bridges may be in the range of 10-40 µs, or even higher, such that the presence of such devices that are not equipped with IEEE 1588 TCs can be easily detected. Bridging devices not equipped for the IEEE 1588 do not respond at all and are easily detected by a timeout.

Messages between the network devices 10, 20, 30, 40, 50 may be sent using multicast messaging or unicast transmission. The messages may conform to the IEEE 1588 standard, or any other similar standard. In case the messages are transmitted on layer 3, the messages may be transmitted using IP packets. For example, UDP packets may be transmitted (UDP: User Datagram Protocol). Messages may also be transmitted on layer 2 through encapsulation in IEEE 802.3 Ethernet, or any other layer 2 protocol.

The determined communication delays d12, d13, d14 between the network devices 10, 20, 30, 40, 50 may be stored in a management information base (MIB) or in any other database. The MIB may be stored on the network devices 10, 20, 30, 40, 50 or one of the end devices 21, 41, 42, 51, 52. Hence, each network device 10, 20, 30, 40, 50 may have stored thereon the local topology to its neighboring devices. For example, network device 10 according to FIG. 1 may have stored the delay d12 through network link 12 to the network device with numeral 20, the delay d14 through network link 14 to the network device with numeral 40, the delay d13 through network link 13 to the network device with numeral 30, and the delay d1M through network link 1M to the grandmaster device 21.

The data stored in the MIB of the network device with label 10, for example, may include the MAC address (MAC: Media Access Control) of the network device with label 10 and the MAC address of the neighboring network devices 20, 30, 40 together with the determined communication delays d12, d13, d14 to the neighboring network devices. As such, the MIB includes the local network topology of the network device with label 10, namely the information about network links 12, 13, 14 and neighboring network devices 20, 30, 40 as well as the information about a distance or communication delay between the network device with label 10 and the neighboring network devices 20, 30, 40.

A network management agent A may be configured to collect the MIB or any other database stored in the network devices 10, 20, 30, 40, 50. For example, data of the MIB of the network devices 10, 20, 30, 40, 50 may be collected through the SNMP protocol (SNMP: Simple Network Management Protocol). Collection of the MIB or the database stored in the network devices 10, 20, 30, 40, 50 may be performed through any other protocol, such as, for example, IEC 61850, which is a widely-used standard for electrical substation automation systems.

Accordingly, the network management agent A may collect the information about network links 12, 13, 14 between network devices 10, 20, 30, 40, 50 as well as the distance or communication delay d12, d13, d14.

The network management agent A may be configured to generate a graphical network diagram showing the actual topology of the communication network. The network diagram does not necessarily reflect the geographical location of the network devices. However, the distances or communication delays between the network devices may well be shown graphically.

The network management agent A may be configured to update a graphical network diagram showing the design of the network topology of the communication network. Hence, when engineering a communication network, the network configuration may be designed according to design requirements, which may include geographical allocation of the network devices 10, 20, 30, 40, 50, e.g. ordered by bays, cabinets, etc., wherein data may be coded in a wiring diagram or in an SCD file according to the IEC 61850 standard. Knowing the physical dimensions, an engineering tool, which is an example of the above-described computer processing device, can predict the approximate values of the link delays. The communication network may be commissioned according to the design requirements. In a graphical network diagram of the commissioned communication network, those network links are graphically indicated which have been wrongly commissioned, which are erroneous/missing or which show a communication delay exceeding a certain value. This helps detect devices which are not working properly, devices of the wrong type or unwanted devices that could ruin the synchronization.

Figure 2:
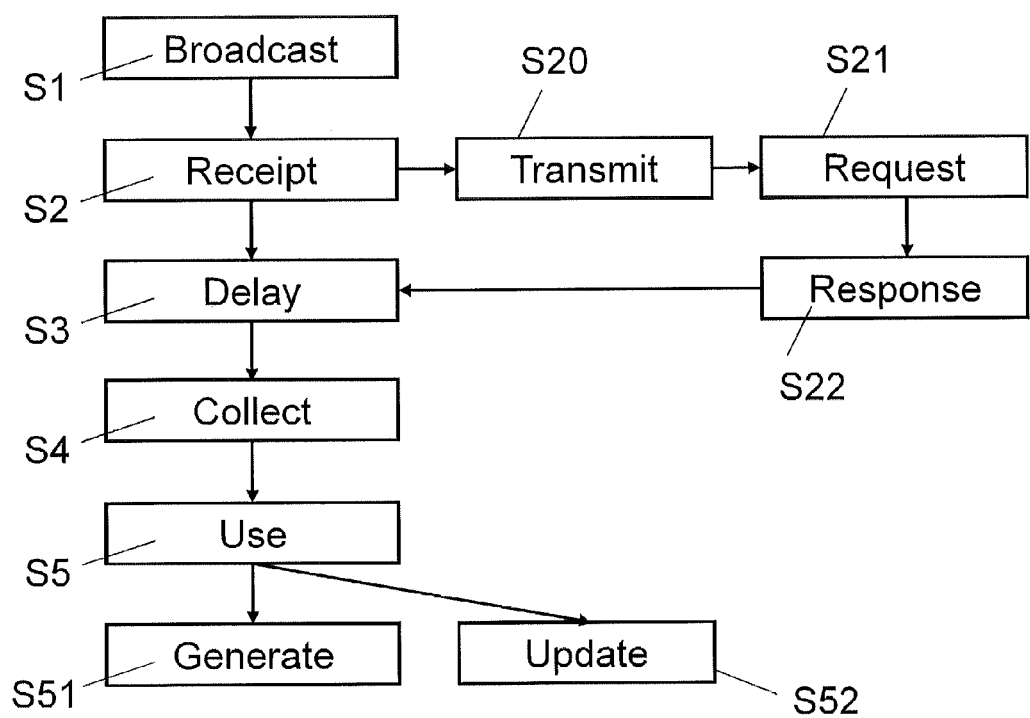
FIG. 2 shows an exemplary sequence of steps for determining the network topology of a communication network.

FIG. 2 shows schematically exemplary steps for the determination of the network topology of a communication network 1 according to an exemplary embodiment of the present disclosure. In step S1, a synchronization message is broadcasted. In step S2, the synchronization message 2 is received by the one or more first network devices 10 on one of its network interfaces. In step S3, the communication delays d12, d13, d14 between the one or more first network devices 10 and the one or more neighboring network devices 20, 30, 40 is determined. In step S4, the determined one or more communication delays d12, d13, d14 are collected, for example, through SNMP from a MIB stored in the one or more first network devices 10. In step S5, the one or more communication delays d12, d13, d14 are used to determine the network topology of the communication network 1.

In step S21, the synchronization message 2 triggers transmission of a peer delay request message 3 to the one or more neighboring network devices 20, 30, 40. In step S22, the peer delay request message 3 triggers transmission of a peer delay response message 4 to the one or more first network devices 10. In step S3, the peer delay response message 4 enables determination or computation of the one or more communication delays d12, d13, d14 between the one or more first network devices 10 and the one or more neighboring network devices 20, 30, 40.

In step S20, the synchronization message 2 is received on one of the network interfaces of the one or more first network devices 10 and the synchronization message is transmitted to one or more of the other network interfaces.

In step S51, a graphical network diagram showing the actual network topology of the communication network is generated. In step S52, a graphical network diagram showing the design of the network topology of the communication network is updated.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for determining the network topology of a communication network including at least one first network device connected through at least one network link to at least one neighboring network device, the at least one first network device and the at least one neighboring network device being synchronized according to the IEEE 1588 standard, the method comprising:

determining, by each of the at least one first network device, an identity of the at least one neighboring network device and a communication delay of the at least one network link, respectively;

collecting, by a network manager, the respective determined identity and communication delay, and determining a network topology of the communication network including a length of the at least one network link therefrom;

receiving a broadcast synchronization message on a first network interface of the at least one first network device;

transmitting, by the at least one first network device, the synchronization message on at least one second network interface to the at least one neighboring network device;

transmitting, by the at least one neighboring network device, a response message to the at least one first network device; and determining, by the at least one first network device, the at least one communication delay between the at least one first network device and the at least one neighboring network devices from the synchronization message and the response message.

2. The method according to claim 1, comprising:

generating a graphical network diagram showing an actual network topology of the communication network.

3. The method according to claim 1, comprising:

updating a graphical network diagram showing the design of the network topology of the communication network.

4. The method according to claim 1, comprising:

collecting the at least one communication delay through SNMP (SNMP: Simple Network Management Protocol) from a MIB (MIB: Management Information Base) stored in the at least one first network devices, together with a MAC address (MAC: Media Access Control) of the at least one first network device and the MAC address of the corresponding at least one neighboring network device.

* * * * *